US011893827B2

(12) United States Patent
Ehrlich

(10) Patent No.: US 11,893,827 B2
(45) Date of Patent: Feb. 6, 2024

(54) SYSTEMS AND METHODS OF DETECTING MASK USAGE

(71) Applicant: Johnson Controls Tyco IP Holdings LLP, Milwaukee, WI (US)

(72) Inventor: Alexis B. Ehrlich, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/203,088

(22) Filed: Mar. 16, 2021

(65) Prior Publication Data

US 2022/0300727 A1    Sep. 22, 2022

(51) Int. Cl.
*G06T 7/00* (2017.01)
*G06V 40/16* (2022.01)
*G06V 20/52* (2022.01)
*G06V 40/10* (2022.01)
*G08B 21/18* (2006.01)

(52) U.S. Cl.
CPC ............ *G06V 40/161* (2022.01); *G06V 20/52* (2022.01); *G06V 40/10* (2022.01); *G06V 40/171* (2022.01); *G08B 21/18* (2013.01)

(58) Field of Classification Search
CPC .. G06V 40/172; G06V 40/161; G06V 40/171; G06V 40/168; G06V 40/165; G06V 20/52; G06V 40/166; G06V 40/16; G06V 10/82; G06V 40/10; G06V 40/173; G06V 40/45; G06V 20/20; G06V 40/169; G06V 20/53; G06V 10/25; G06V 40/162; G06K 9/6256; G06K 9/6268; G06K 9/6262; G06K 9/629; G06K 7/1417; G06K 9/6277; G06K 9/6267; G06K 9/627; G06K 9/6201; G06K 9/6215
See application file for complete search history.

(56) References Cited

U.S. PATENT DOCUMENTS 10,984,225 B1 * 4/2021 Ghosh ................. G06V 40/171
11,011,003 B1 * 5/2021 Jafri ....................... G16H 50/80
(Continued)

FOREIGN PATENT DOCUMENTS

WO    WO-2021159630 A1 *    8/2021    ............... A61B 5/01

OTHER PUBLICATIONS

Abishek et al., "End to End COVID-19 Public Screening System," 2021 IEEE International Conference on Electronics, Computing and Communication Technologies (CONECCT), Jul. 2021, 7 pages.
(Continued)

*Primary Examiner* — Quan M Hua
(74) *Attorney, Agent, or Firm* — ArentFox Schiff LLP

(57) ABSTRACT

Example aspects include a method, an apparatus and a computer-readable medium of enforcing a mask wearing rule, comprising monitoring video frames of one or more video feeds. The aspects further include detecting a person in at least one video frame of the video frames. The at least one video frame corresponding to a first area of one or more areas. Additionally, the aspects further include determining whether the person is in violation of a mask wearing rule. Additionally, the aspects further include generating an alert in response to determining that the person is in violation of the mask wearing rule.

19 Claims, 5 Drawing Sheets

(56) References Cited

U.S. PATENT DOCUMENTS

| | | | |
|---|---|---|---|
| 2006/0067591 A1* | 3/2006 | Guzzwell | G06T 7/73 |
| | | | 382/289 |
| 2008/0247609 A1* | 10/2008 | Feris | G06V 40/103 |
| | | | 340/506 |
| 2012/0146792 A1* | 6/2012 | De Luca | G08B 21/22 |
| | | | 340/568.1 |
| 2021/0141896 A1* | 5/2021 | Streit | G06F 21/554 |
| 2022/0051807 A1* | 2/2022 | Subramanian | G16H 50/80 |
| 2022/0079439 A1* | 3/2022 | Heislop | G16H 50/70 |

OTHER PUBLICATIONS

International Search Report in PCT/US2022/071024, dated Jul. 4, 2022, 4 pages.
Petrovic et al., "IoT-based System for COVID-19 Indoor Safety Monitoring," IcETRAN 2020 Conference, Sep. 2020, 7 pages.
Petrovic et al., "Smart technologies for Covid-19 indoor monitoring," in: Viruses, Bacteria and Fungi in the Built Environment, Elsevier Science, Dec. 2021, 18 pages.

* cited by examiner

SYSTEMS AND METHODS OF DETECTING MASK USAGE

BACKGROUND

Technical Field

The present disclosure relates generally to video monitoring systems, and more particularly, to systems and methods for using video analytics to detect mask usage by persons that appear in a video feed.

Introduction

Video surveillance systems may frequently be used to monitor desired environments, such as, but not limited to, retail store premises, office buildings, distribution centers, factories, parks, and open spaces. Furthermore, entities that own, manage, or use such environments may implement mask wearing rules designed to reduce the spread of a contagious disease (e.g., COVID-19) by occupants or visitors to those environments. For example, it may be advantageous to automatically detect whether the occupants and visitors to an environment are wearing a mask. That is, to detect that the mask is worn in a manner that reduces the spread of a contagious disease by the wearer. However, conventional video surveillance systems may not provide solutions for automatic detection of mask usage. As a result, entities may have to resort to manual processes to implement mask wearing rules, which may be time consuming and/or inefficient. Thus, improved solutions for enforcing mask wearing rules are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of detecting mask usage, comprising monitoring video frames of one or more video feeds. The method further includes detecting a person in at least one video frame of the video frames. The at least one video frame corresponding to a first area of one or more areas. Additionally, the method further includes determining whether the person is in violation of a mask wearing rule. Additionally, the method further includes generating an alert in response to determining that the person is in violation of the mask wearing rule.

Another example aspect includes an apparatus for detecting mask usage, comprising a non-transitory memory storing computer-executable instructions and a processor communicatively coupled with the non-transitory memory. The processor is configured to execute the computer-executable instructions to monitor video frames of one or more video feeds. The processor is further configured to execute further instructions to detect a person in at least one video frame of the video frames. The at least one video frame corresponding to a first area of one or more areas. Additionally, the processor further configured to execute further instructions to determine whether the person is in violation of a mask wearing rule. Additionally, the processor further configured to execute further instructions to generate an alert in response to determining that the person is in violation of the mask wearing rule.

Another example aspect includes a non-transitory computer-readable medium storing computer-readable instructions for detecting mask usage, executable by a processor to monitor video frames of one or more video feeds. The instructions are further executable to detect a person in at least one video frame of the video frames. The at least one video frame corresponding to a first area of one or more areas. Additionally, the instructions are further executable to determine whether the person is in violation of a mask wearing rule. Additionally, the instructions are further executable to generate an alert in response to determining that the person is in violation of the mask wearing rule.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
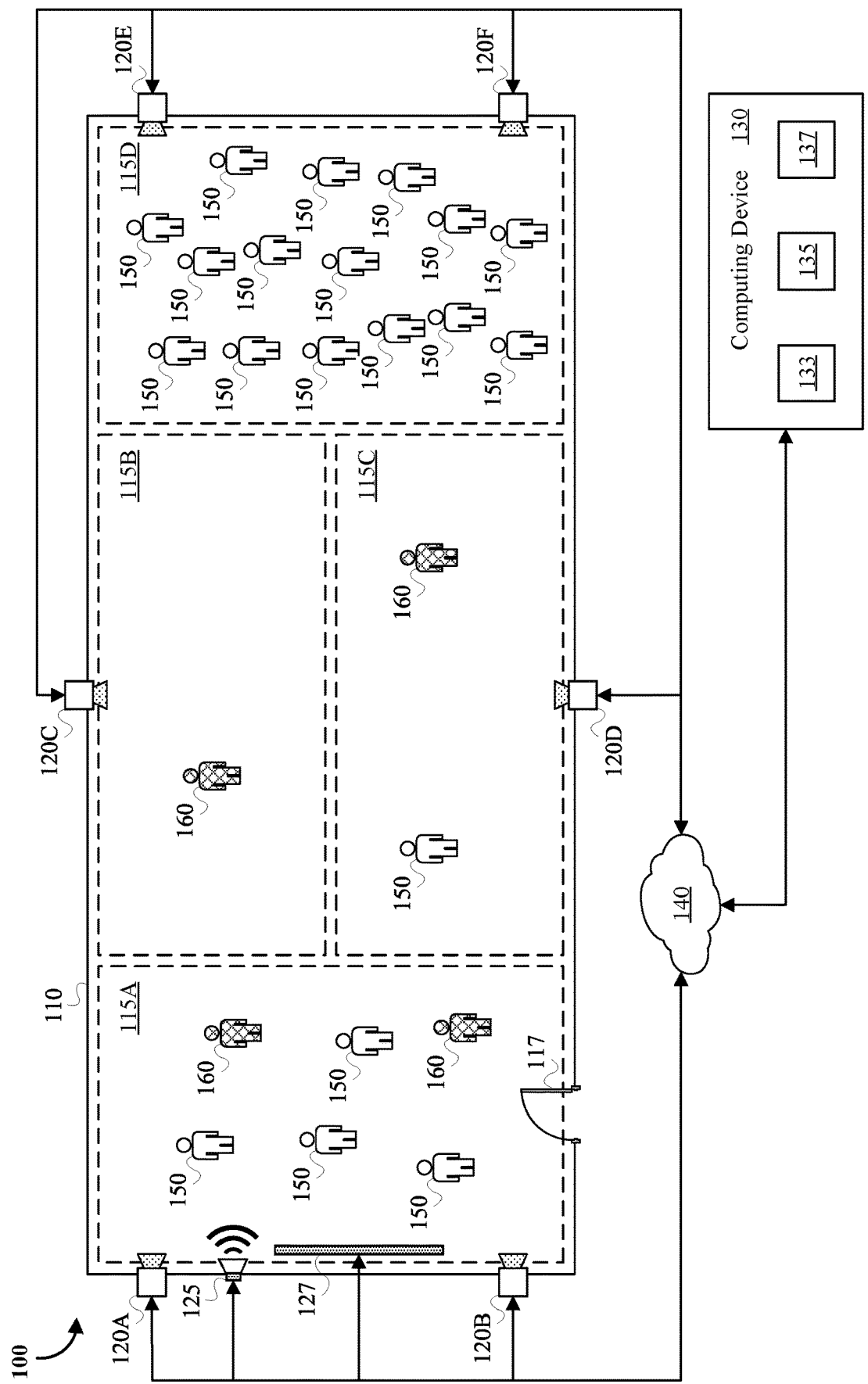
FIG. 1 is a schematic diagram of an example environment including a system for detecting mask usage, in accordance with various aspects of the present disclosure.

It will be readily understood that the components of the aspects as generally described herein and illustrated in the appended figures could be arranged and designed in a wide variety of different configurations. Thus, the following more detailed description of various aspects, as represented in the figures, is not intended to limit the scope of the present disclosure, but is merely representative of various aspects. While the various aspects of the aspects are presented in drawings, the drawings are not necessarily drawn to scale unless specifically indicated.

The present solution may be embodied in other specific forms without departing from its spirit or essential characteristics. The described aspects are to be considered in all respects only as illustrative and not restrictive. The scope of the present solution is indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single aspect of the present solution. Rather, language referring to the features and advantages is understood to mean that a specific feature, advantage, or characteristic described in connection with an aspect is included in at least one aspect of the present solution. Thus, discussions of the features and advantages, and similar language, throughout the specification may, but do not necessarily, refer to the same aspect.

Furthermore, the described features, advantages, and characteristics of the present solution may be combined in any suitable manner in one or more aspects. One skilled in the relevant art will recognize, in light of the description herein, that the present solution can be practiced without one or more of the specific features or advantages of a particular aspect. In other instances, additional features and advantages may be recognized in certain aspects that may not be present in all aspects of the present solution.

Reference throughout this specification to "one aspect," "an aspect," or similar language means that a particular feature, structure, or characteristic described in connection with the indicated aspect is included in at least one aspect of the present solution. Thus, the phrases "in one aspect", "in an aspect," and similar language throughout this specification may, but do not necessarily, all refer to the same aspect.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Conventional video surveillance systems may not be suitable for enforcement of mask wearing rules in environments (e.g., retail store premises, office buildings, distribution centers, factories, parks, open spaces). For example, a conventional video surveillance system may not provide for automatic detection of mask usage by one or more persons at the environments based on video feeds from cameras located at the environments. That is, the conventional video surveillance system may not be able to determine whether occupants and/or visitors appearing on the video feeds are wearing a mask (e.g., covering at least the nose and mouth of the wearer). As such, an entity that owns, manages, or uses these environments may have to resort to manual processes to implement the mask wearing rule. However, implementation of these manual processes may be impractical given that the conventional video surveillance system may be monitoring hundreds of video feeds from cameras located at many environments. In addition, image quality of the cameras used by the conventional video surveillance system may not be sufficient to determine whether a person is wearing a mask. Further, these manual processes may be excessively time and labor intensive to implement, as well as, subject to inaccuracies due to human error. For example, security personnel tasked with monitoring the video feeds may be occupied assisting visitors, engaged in other duties, and/or otherwise distracted from the video feed monitors.

Examples of the technology disclosed herein provide for multiple manners to detect mask usage. In certain aspects, the automatic detection of mask usage may reduce time and labor needed for enforcement of mask wearing rules. Further, aspects presented herein may increase accuracy and effectiveness of enforcement of the mask wearing rule over conventional video surveillance systems.

These and other features of the present disclosure are discussed in detail below with regard to FIGS. 1-6.

FIG. 1 is a diagram illustrating an example video surveillance system 100. The video surveillance system 100 may be configured to monitor one or more areas of environment 110. The environment 110 may be a retail store premise, an office building, a distribution center, a factory, a park, or an open space. The present solution is not limited in this regard, and can be used in other environments. Notably, the present solution may be employed in any environment in which mask wearing rules need to be enforced.

The video surveillance system 100 may be configured to monitor the environment 110, or a portion of the environment 110, and to detect one or more persons 150, 160 that may be located within the environment 110. Alternatively or additionally, the video surveillance system may be configured to monitor one or more environments. The video surveillance system 100 may be further configured to determine whether the one or more persons 150, 160 are wearing a mask. The persons 150 may represent one or more persons that may be wearing a mask (e.g., both nose and mouth are covered) and the persons 160 may represent one or more persons that may not be wearing the mask (e.g., nose and/or mouth are uncovered).

The video surveillance system 100 may employ one or more cameras 120A-120F (generally referred to herein as "camera(s) 120") that may be arranged to capture video from one or more areas 115A-115D (generally referred to herein as "area(s) 115") of the environment 110. For example, cameras 120A and 120B may capture video from area 115A, camera 120C may capture video from area 115B, camera 120D may capture video from area 115C, and cameras 120E and 120F may capture video from area 115D. That is, each camera 120 may capture video from an area 115 of environment 110, and each area 115 may be monitored by a camera 120.

In some aspects, the video surveillance system 100 may employ a different quantity of the cameras 120 as those shown in FIG. 1, as well as, environment 110 may be subdivided into a different number of areas as those shown in FIG. 1, without departing from the scope described herein. In other aspects, environment 110 may comprise multiple areas that may not be located within the same environment, such as front door(s) and back door(s).

In other optional or additional aspects, the environment 110 may comprise an access control point 117. The access control point 117 may comprise any device and/or system that may provide access control functionality. That is, the access control point 117 may refer to a device and/or system that may require a person to present identification information in order to be granted access to enter and/or exit an area, such as, but not limited to, an access-controlled door, a turnstile, an elevator, and an identification checkpoint. In some aspects, the access control point 117 may comprise devices for acquiring identification information from the person attempting to obtain access, such as card readers, key fob readers, biometric readers, and the like.

The identification information may be provided to the video surveillance system 100 for identifying one or more persons 150, 160 in the environment 110. The video surveillance system 100 may be configured to grant access to the person if or when the person is in compliance with the mask wearing rule. That is, the video surveillance system 100 may grant access to the person in response to determining that the person is wearing a mask. Alternatively or additionally, the video surveillance system 100 may be configured to deny access to the environment 110 to a person attempting to enter the environment 110 via the access control point 117 while not wearing a mask.

The one or more cameras 120 may be digital video cameras such as security cameras. The one or more cameras 120 may provide a constant video feed of an area 115. Image quality of one or more video feeds provided by the one or more cameras 120 may be sufficient to determine whether a person appearing in the one or more video feeds is wearing a mask.

The one or more cameras 120 may generally be oriented in a default direction to capture a particular area 115 where activity may be expected, but the one or more of the cameras 120 may be mounted on a gimbal that may allow for rotation and/or panning of the respective camera 120. For example, the video surveillance system 100 may move the camera 120 to maintain a field of view of the camera 120 on the one or more persons 150, 160. In some aspects, the video surveillance system 100 may allow for manual control of the rotation and/or panning of the camera 120.

The video surveillance system 100 may comprise a speaker 125 configured to generate an alert that may be audible by the one or more persons 150, 160 located within the environment 110 (e.g., one or more areas 115). In some aspects, the speaker 125 may comprise, or be part of, a public announcement system. The video surveillance system 100 may comprise a display 127 such as a digital signage. The display 127 may be configured to display textual, graphical, and/or video messages generated by the video surveillance system 100. For example, the display 127 may display alerts generated by the video surveillance system 100 indicating that one or more persons 150, 160 in one or more areas 115 are in violation of the mask wearing rule. In some aspects, the alerts may indicate that the one or more persons 150, 160 are denied access to one or more areas 115. Alternatively or additionally, the alerts may indicate remediation steps that may be taken by the one or more persons 150, 160 to comply with the mask wearing rule.

The cameras 120, the speaker 125, and the display 127 may be communicatively coupled with a network 140, such as the Internet. Other networks may also or alternatively be used, including but not limited to private intranets, corporate networks, local area networks ("LAN"), metropolitan area networks ("MAN"), wireless networks, personal networks ("PAN"), and the like.

In some aspects, the video feeds captured by the one or more cameras 120 may be transmitted via the network 140 to a computing device 130, which may implement all or a portion of the functionality described herein. That is, the computing device 130 may be communicatively coupled with the network 140, and, as such, may indirectly receive one or more video feeds from the one or more cameras 120 via the network 140. Alternatively or additionally, the computing device 130 may be communicatively coupled directly (e.g., hard-wired) with the one or more cameras 120. For example, the computing device 130 may receive the one or more video feeds directly from the one or more cameras 120.

The computing device 130 may be any type of known computer, server, or data processing device. For example, the computing device 130 may be any mobile or fixed computer device including but not limited to a computer server, a desktop or laptop or tablet computer, a cellular telephone, a personal digital assistant ("PDA"), a handheld device, any other computer device having wired and/or wireless connection capability with one or more other devices, or any other type of computerized device capable of processing video data captured by the one or more cameras 120. In some aspects, the computing device 130 may be a cloud-based or shared computing structure accessible through the network 140. The computing device 130 may be located in a location remote from the environment 110, or may be integrated as part of the video surveillance system 100.

The computing device 130 may comprise a processor 133 which may be configured to execute or implement software, hardware, and/or firmware modules that perform any functionality described herein. For example, the processor 133 may be configured to execute or implement software, hardware, and/or firmware modules that perform any functionality described herein with reference to a mask detection component 137 or any other component/system/device described herein.

The processor 133 may be a micro-controller, an application-specific integrated circuit ("ASIC"), a digital signal processor ("DSP"), or a field-programmable gate array ("FPGA"), and/or may comprise a single or multiple set of processors or multi-core processors. Moreover, the processor 133 may be implemented as an integrated processing system and/or a distributed processing system. The computing device 130 may further comprise a memory 135, such as for storing local versions of applications being executed by the processor 133, or related instructions, parameters, and the like.

The memory 135 may include a type of non-transitory memory usable by a computer, such as random access memory ("RAM"), read only memory ("ROM"), tapes, magnetic discs, optical discs, solid state drives ("SSDs"), volatile memory, non-volatile memory, and any combination thereof. Alternatively or additionally, the processor 133 and the memory 135 may comprise and execute an operating system executing on the processor 133, one or more applications, display drivers, etc., and/or other components of the computing device 130.

The computing device 130 may comprise a mask detection component 137 configured to monitor video frames of the one or more video feeds from the one or more cameras 120, to detect a person (e.g., 150, 160) in the video frames, and to generate an alert in response to determining that the person is in violation of a mask wearing rule.

The mask wearing rule may indicate one or more characteristics that need to be met in order to comply with the mask wearing rule. In some aspects, the mask wearing rule may indicate that a person's nose and mouth is to be covered by a mask in order for comply with the mask wearing rule. In other aspects, the mask wearing rule may indicate one or more enforcement areas that delineate one or more areas 115 of the environment 110 within which the mask wearing rule is to be enforced.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system is shown in FIG. 2.

Figure 2:
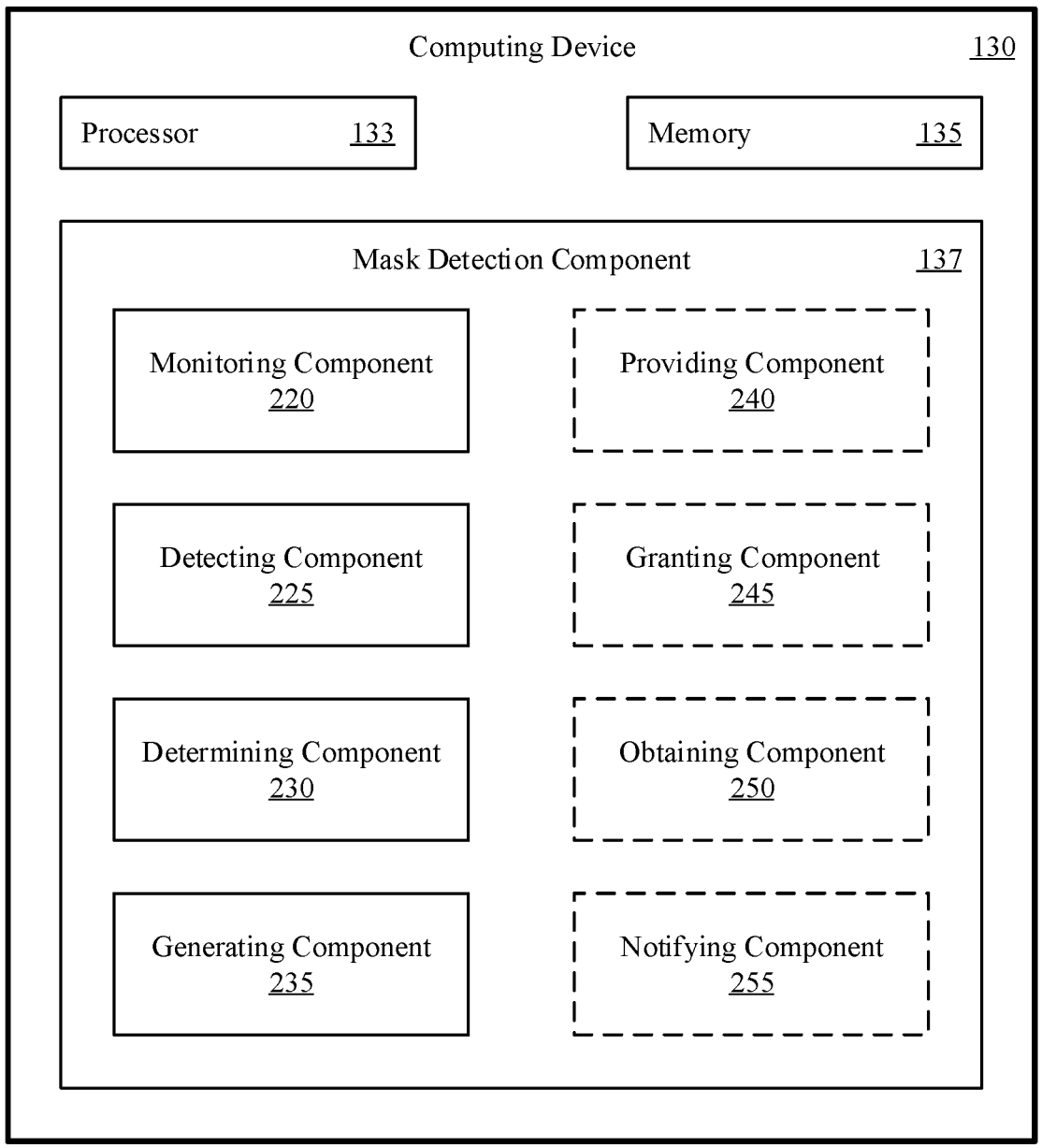
FIG. 2 is a block diagram illustrating an example computing device, in accordance with various aspects of the present disclosure.
Figure 3:
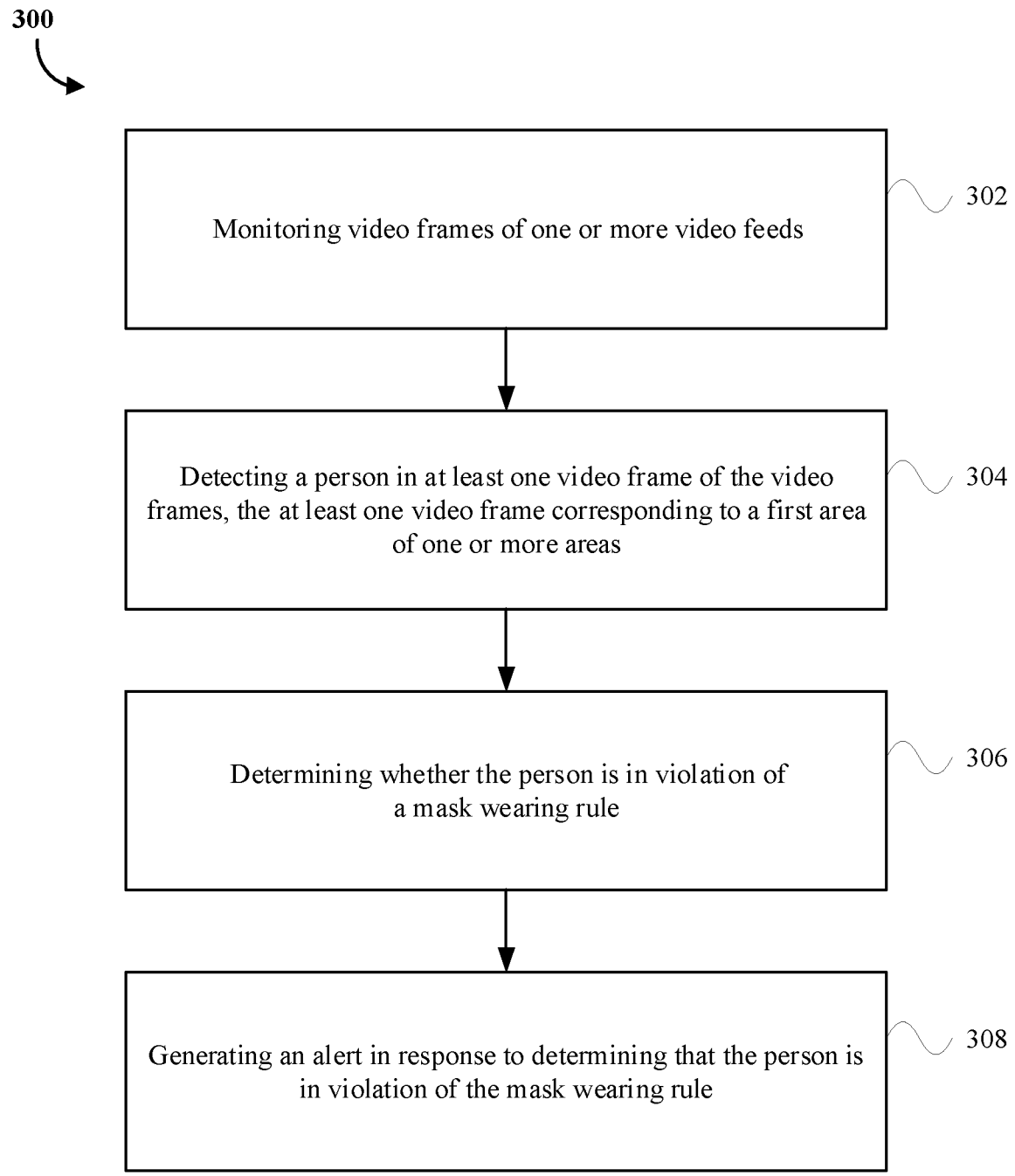
FIG. 3 is a flowchart of a method of detecting mask usage to be performed by a computing device, in accordance with various aspects of the present disclosure.

FIG. 2 is a block diagram of an example computing device 130 for video surveillance. The computing device 130 depicted in FIG. 2 is similar in many respects to the computing device 130 described above with reference to FIG. 1, and may include additional features not mentioned above. In some aspects, the computing device 130 may comprise a processor 133 configured to execute or implement software, hardware, and/or firmware modules that perform any functionality described herein (e.g., mask detection component 137), a memory 135 configured to store instructions executed the processor 133, and a mask detection component 137 configured to detect mask usage and to enforce a mask wearing rule.

In some aspects, the computing device 130 may be configured to perform one or more operations described herein in connection with FIG. 1. Alternatively or additionally, the computing device 130 may be configured to perform one or more processes described herein, such as method 300 of FIGS. 3-6. In other aspects, the computing device may include one or more components of the computing device described above in connection with FIG. 1.

In some aspects, the mask detection component 137 may include a set of components, such as a monitoring component 220, a detecting component 225, a determining component 230, a generating component 235, a providing component 240, a granting component 245, an obtaining component 250, and a notifying component 255, or a combination thereof. Alternatively or additionally, the set of components may be separate and distinct from the mask detection component 137. In other aspects, one or more components of the set of components may include or may be implemented within a controller/processor (e.g., processor 133), a memory (e.g., memory 135), or a combination thereof, of the computing device 130 described in FIGS. 1-2. Alternatively or additionally, one or more components of the set of components may be implemented at least in part as software stored in a memory, such as memory 135. For example, a component (or a portion of a component) may be implemented as instructions or code stored in a non-transitory computer-readable medium and executable by a controller or a processor to perform the functions or operations of the component.

The monitoring component 220 may be configured to monitor video frames of one or more video feeds. That is, the monitoring component 220 may monitor the video frames of the one or more video feeds captured by the one or more cameras 120. For example, the monitoring component 220 may receive the one or more video feeds from the one or more cameras 120 monitoring one or more areas 115 of the environment 110. The monitoring component 220 may extract video frames from the one or more video feeds in order to perform mask wearing detection on the video frames, as described herein.

The detecting component 225 may be configured to detect a person (e.g., 150, 160) in at least one video frame of the video frames. The at least one video frame may correspond to a first area 115 of one or more areas 115. That is, the detecting component 225 may analyze the extracted video frames to detect the person (e.g., 150, 160) in the first area 115 that may appear in the at least one video frame of the video frames. For example, the detecting component 225 may determine whether objects that appear in the at least one video frame of the video frames constitute a person (e.g., 150, 160).

In some optional or additional aspects, the detecting component 225 may access a database or other data store of images and use image processing algorithms, machine learning classifiers, and the like on the video frames to establish what objects in the video frames may likely represent a person 150, 160. In other optional or additional aspects, the detecting component 225 may be provided with base images of areas 115 in which no persons are present. Alternatively or additionally, the detecting component 225 may compare the video frames of the one or more video feeds with the base images having no persons present to determine whether additional objects in the video frames may represent the one or more persons 150, 160. In other optional or additional aspects, the detecting component 225 may place bounding boxes around objects identified in the video frames, and may discard bounding boxes whose dimensions do not meet certain thresholds as likely non-human objects. For example, bounding boxes that identify objects having dimensions smaller or larger than a conventional human size (e.g., a footprint of 2 feet by 2 feet or less, a height of over 7 feet, or a width of over 4 feet) may be discarded. Alternatively or additionally, bounding boxes whose positions change rapidly over subsequent video frames may be discarded. As such, non-human objects, such as birds, dogs, handcarts, suitcases, or cars may not be identified as persons (e.g., 150, 160) by the detecting component 225.

The determining component 230 may be configured to determine whether the person 150, 160 is in violation of a mask wearing rule. That is, the determining component 230 may determine whether the person 150, 160, that has been detected by detecting component 225, is in compliance with the mask wearing rule. In some aspects, the determining component 230 may utilize one or more facial features of the person 150, 160 to determine whether the person 150, 160 is wearing a mask. For example, if or when the facial features corresponding to the person (e.g., 150) does not comprise nose and mouth facial features, the determining component 230 may determine that the person is wearing a mask, such as persons 150. That is, if or when both of a person's nose and mouth are hidden from view, the person 150 is likely to be wearing a mask. For another example, if or when the facial features corresponding to another person (e.g., 160) comprise nose or mouth facial features, the determining component 230 may determine that the person 160 is not wearing a mask, such as persons 160. That is, if or when a person's nose or mouth are visible, the person 160 is unlikely to be wearing a mask.

In other optional or additional aspects, the determining component 230 may determine a location of a person 150, 160 within environment 110. The determining component 230 may determine that a person 150, 160 is located within a particular area 115 (e.g., 115A-115D) of the environment 110. In some aspects, the determining component 230 may determine a first area 115 of the at least one video frame as the location of the first person according to a location of a camera 120 that captured the at least one video frame.

In other optional or additional aspects, the determining component 230 may determine that the location of the person 150, 160 is inside of an enforcement area. For example, the determining component 230 may determine, according to the mask wearing rule, whether the location of the person 150, 160 is inside or outside the enforcement area. In some aspects, the mask wearing rule may indicate that one or more areas 115 (e.g., 115A-115D) of the environment 110 comprise at least a portion of an enforcement area. That is, the mask wearing rule may indicate that the mask wearing rule is to be enforced in the enforcement area delineated by the one or more areas 115. For example, if or when the mask wearing rule indicates that the area 115A is inside the enforcement area, the determining component 230 may determine that persons not wearing a mask (e.g., 160) appearing in the area 115A may be in violation of the mask wearing rule. Alternatively or additionally, the mask wearing rule may indicate that other areas 115 (e.g., 115B-115D) of the environment 110 are outside of the enforcement area. That is, the mask wearing rule may indicate that the mask wearing rule is not to be enforced in the other areas 115. For example, if or when the mask wearing rule indicates that the area 115B is outside the enforcement area, the determining component 230 may determine that persons not wearing a mask (e.g., 160) appearing in the area 115B may be in compliance with the mask wearing rule.

In other optional or additional aspects, the mask wearing rule may indicate a minimum quantity of persons 150, 160 that may simultaneously occupy an area 115 for the mask wearing rule to be enforced. In these optional or additional aspects, the mask wearing rule may indicate a minimum occupancy rate threshold of one person for an area 115. That is, if or when one person occupies the area 115, the area 115 may not be an enforcement area. Alternatively or additionally, if or when more than one person occupies the area 115 may be an enforcement area. For example, if or when area 115 comprises a private office, then one person not wearing a mask (e.g., 160) may work alone in the private office without triggering a mask wearing rule violation. In another example, if or when two or more persons occupy the private office, then the two or more persons must wear a mask to avoid a mask wearing rule violation.

The generating component 235 may be configured to generate an alert in response to the determining component 230 determining that the person 160 is in violation of the mask wearing rule. In some aspects, the generating component 235 may cause the speaker 125 to generate an audible alarm and/or a spoken message that may be audible to the person 160 that is in violation of the mask wearing rule. That is, the alarm may be audible within the first area 115 corresponding to the at least one video frame in which the person 160 appears.

Alternatively or additionally, the generating component 235 may cause the display 127 to display textual, graphical, and/or video messages that may be visible by the person 160 that is in violation of the mask wearing rule. That is, the displayed message may be visible within the first area 115 corresponding to the at least one video frame in which the person 160 appears. In some aspects, the generating component 235 may cause the display 127 to display alerts indicating that the person 160 is denied access to one or more areas 115. Alternatively or additionally, the displayed alerts may indicate remediation steps that may be taken by the person 160 to comply with the mask wearing rule.

In other optional or additional aspects, the generating component 235 may transmit a notification indicating that a mask wearing rule violation has been determined. For example, the generating component 235 may transmit a message (e.g., email, short message service ("SMS"), automated voice call) to one or more recipients comprising an indication that the person 160 is in violation of the mask wearing rule. In some aspects, the notification may be transmitted to a third-party local to the environment 110, such as security personnel, building management personnel, and the like. Alternatively or additionally, the notification may be transmitted to a third-party remote to the environment 110, such as law enforcement, civil health authorities, and the like. In other optional or additional aspects, the notification may be transmitted to one or more persons associated with the first area 115 corresponding to the at least one video frame in which the person 160 appears. For example, if or when the environment 110 comprises an office building, the notification may be transmitted to personnel assigned to work in the first area 115. Alternatively or additionally, the notification may be transmitted to personnel in charge of the first area. For example, if or when the first area 115 is a hardware lab, then the notification may be transmitted to a hardware lab manager for the hardware lab.

In other optional or additional aspects, the generating component 235 may be configured to provide at least one video frame displaying the person 160 that is in violation of the mask wearing rule. For example, the message generated by the generating component 235 and displayed by the display 127 may comprise the at least one video frame displaying the person 160 that is in violation of the mask wearing rule. Alternatively or additionally, the message (e.g., email, SMS, automated voice call) transmitted by the generating component may comprise the at least one video frame displaying the person 160 that is in violation of the mask wearing rule.

The providing component 240 may be configured to provide the at least one video frame to a facial feature detection algorithm. That is, the providing component 240 may provide to the facial feature detection algorithm the at least one video frame extracted by the monitoring component 220. In some aspects, the providing component 240 may provide identification information corresponding to the person 150, 160 appearing in the at least one video frame to the facial feature detection algorithm. For example, the identification information may comprise identifying information such as name, address, employer, access card identification number, key fob identification number, biometric information, and the like. The facial feature detection algorithm may be configured to detect facial features of the person 150, 160. For example, the facial feature detection algorithm may comprise a machine learning classifier having been trained to extract facial features (e.g., eyes, noses, mouths, ears) from video frames in which one or more persons appear. Alternatively or additionally, the facial feature detection algorithm may compare properties of base images of facial features with the properties of the at least one video frame, such as color (e.g., hue, lightness, or saturation), object shape (e.g., shape of face), object size (e.g., of person), and/or other conventional image comparison attributes.

The granting component 245 may be configured to granting access to the person to a second area of the one or more areas in response to the determining component 230 determining that the person is in compliance with the mask wearing rule. For example, the granting component 245 may cause the access control point 117 to grant access to persons 150 that are wearing a mask. Alternatively or additionally, the granting component 245 may cause the access control point 117 to deny access to persons 160 that are not wearing a mask.

The obtaining component 250 may be configured to obtain identification information of the person. For example, the identification information may comprise at least one image of the person. Alternatively or additionally, the identification information may comprise a database record comprising information with which a person 150, 160 detected by the detecting component 225 may be identified, such as facial features. In some aspects, the identification information may comprise other identifying information such as name, address, employer, access card identification number, key fob identification number, biometric information, and the like. In other optional or additional aspects, the identification information may comprise identifying information of another person associated with the person 150, 160. For example, the person 150, 160 may be a registered guest and/or visitor to the environment 110 and the identifying information of the another person may identify an employee and/or tenant of the environment 110 with whom the guest is registered.

The notifying component 255 may be configured to notify the person 160 determined by the determining component 230 to be in violation of the mask wearing rule. In some aspects, the notifying component 255 may cause the speaker 125 to generate an audible alarm and/or a spoken message that may be audible by the person 160. In other optional or additional aspects, the notifying component 255 may cause the display 127 to display textual, graphical, and/or video messages that may be visible by the person 160. In other optional or additional aspects, the notifying component 255 may transmit a message (e.g., email, SMS, automated voice call) to the person 160 notifying the person 160 of the mask wearing rule violation. In other optional or additional aspects, the notifying component 255 may transmit a message (e.g., email, SMS, automated voice call) to another person associated with the person 160 that is in violation of the mask wearing rule. For example, the person 160 that is in violation of the mask wearing rule may be a registered guest and/or visitor to the environment 110, and the notifying component 255 may transmit the message to an employee and/or tenant of the environment 110 with whom the guest is registered.

Referring to FIGS. 3-6, in operation, computing device 130 may perform a method 300 of detecting mask usage. The method 300 may be performed by the computing device 130 (which may include the memory 135 and which may be the entire computing device 130 and/or one or more components of the computing device 130, such as mask detection component 137, processor 133, and/or memory 135.) The method 300 may be performed by the mask detection component 137 in communication with the one or more cameras 120.

At block 302, the method 300 includes monitoring video frames of one or more video feeds. For example, in an aspect, the computing device 130, the processor 133, the memory 135, the mask detection component 137, and/or the monitoring component 220 may be configured to or may comprise means for monitoring the video frames of the one or more video feeds.

For example, the monitoring at block 302 may include receiving the one or more video feeds from the one or more cameras 120 monitoring one or more areas 115 of the environment 110. In some aspects, the monitoring at block 302 may further include extracting video frames from the one or more video feeds in order to perform mask wearing detection analysis on the video frames.

Further, for example, the monitoring at block 302 may be performed to gather video frames from the one or more video feeds that may be analyzed in order to detect mask wearing rule violations by persons (e.g., 150, 160) located within the environment 110.

At block 304, the method 300 includes detecting a person in at least one video frame of the video frames, the at least one video frame corresponding to a first area of one or more areas. For example, in an aspect, the computing device 130, the processor 133, the memory 135, the mask detection component 137, and/or the detecting component 225 may be configured to or may comprise means for detecting a person in at least one video frame of the video frames, the at least one video frame corresponding to a first area of one or more areas.

For example, the detecting at block 304 may include classifying objects that appear in the video frames and determining whether the objects constitute a person 150, 160. In some aspects, the detecting at block 304 may include accessing a database or other data store of images and using image processing algorithms, machine learning classifiers, and the like on the video frames to establish which objects in the video frames may likely represent a person 150, 160.

In other optional or additional aspects, the detecting at block 304 may include comparing the video frames of the one or more video feeds with base images having no persons present to determine whether additional objects in the video frames may represent one or more persons 150, 160. In other optional or additional aspects, the detecting at block 304 may include placing bounding boxes around objects identified in the video frames, and discarding bounding boxes whose dimensions do not meet certain thresholds as likely non-human objects. Alternatively or additionally, bounding boxes whose positions change rapidly over subsequent video frames may be discarded. As such, non-human objects, such as birds, dogs, handcarts, suitcases, or cars may not be identified as persons (e.g., 150, 160).

Further, for example, the detecting at block 304 may be performed to detect and classify human objects in the video frames as a person 150, 160 and to discard non-human objects.

At block 306, the method 300 includes determining whether the person is in violation of a mask-wearing rule. For example, in an aspect, the computing device 130, the processor 133, the memory 135, the mask detection component 137, and/or the determining component 230 may be configured to or may comprise means for determining whether the person is in violation of a mask-wearing rule.

For example, the determining at block 306 may include determining that the person 150 is wearing a mask. Alternatively or additionally, the determining at block 306 may include determining that the person 160 is not wearing a mask.

In some aspects, the determining at block 306 may include utilizing one or more facial features of the person 150, 160 to determine whether the person 150, 160 is wearing a mask. For example, if or when the facial features corresponding to the person (e.g., 150) does not comprise nose and mouth facial features, the determining at block 306 may include determining that the person 150 is wearing a mask, such as persons 150. That is, if or when both of a person's nose and mouth are hidden from view, the person 150 is likely to be wearing a mask. For another example, if or when the facial features corresponding to another person (e.g., 160) comprise nose or mouth facial features, the determining at block 306 may include determining that the person 160 is not wearing a mask, such as persons 160. That is, if or when a person's nose or mouth are visible, the person 160 is unlikely to be wearing a mask.

In other optional or additional aspects, the determining at block 306 may include determining a location of the person 150, 160 within environment 110. That is, the determining at block 306 may include determining that the person 150, 160 is located within a particular area 115 (e.g., 115A-115D) of the environment 110. In some aspects, the determining at block 306 may include determining a first area 115 of the at least one video frame as the location of the first person according to a location of a camera 120 that captured the at least one video frame.

In other optional or additional aspects, the determining at block 306 may include determining that the location of the person 150, 160 is inside of an enforcement area. For example, the determining at block 306 may include determining, according to the mask wearing rule, whether the location of the person 150, 160 is inside or outside the enforcement area. In some aspects, the mask wearing rule may indicate that one or more areas 115 (e.g., 115A-115D) of the environment 110 comprise at least a portion of an enforcement area. That is, the mask wearing rule may indicate that the mask wearing rule is to be enforced in the enforcement area delineated by the one or more areas 115. For example, if or when the mask wearing rule indicates that the area 115A is inside the enforcement area, the determining at block 306 may include determining that persons not wearing a mask (e.g., 160) appearing in the area 115A may be in violation of the mask wearing rule. Alternatively or additionally, the mask wearing rule may indicate that other areas 115 (e.g., 115B-115D) of the environment 110 are outside of the enforcement area. That is, the mask wearing rule may indicate that the mask wearing rule is not to be enforced in the other areas 115. For example, if or when the mask wearing rule indicates that the area 115B is outside the enforcement area, the determining at block 306 may include determining that persons not wearing a mask (e.g., 160) appearing in the area 115B may be in compliance with the mask wearing rule.

Further, for example, the determining at block 306 may be performed to automatically determine that the person 160 in environment 110 is not wearing a mask. Such a determination may allow the video surveillance system 100 to automatically enforce mask wearing rules without the need for time and labor intensive manual processes. Thus, aspects presented herein may increase accuracy and effectiveness of the enforcement of mask wearing rules over conventional video surveillance systems.

At block 308, the method 300 includes generating an alert in response to determining that the person is in violation of the mask-wearing rule. For example, in an aspect, the computing device 130, the processor 133, the memory 135, the mask detection component 137, and/or the generating component 235 may be configured to or may comprise means for generating an alert in response to determining that the person 160 is in violation of the mask-wearing rule.

For example, the generating at block 308 may include causing the speaker 125 to generate an audible alarm and/or a spoken message that may be audible to the person 160 that is in violation of the mask wearing rule. The alarm may be audible within the first area 115 corresponding to the at least one video frame in which the person 160 appears.

In some aspects, the generating at block 308 may include causing the display 127 to display textual, graphical, and/or video messages that may be visible by the person 160 that is in violation of the mask wearing rule. The displayed message may be visible within the first area 115 corresponding to the at least one video frame in which the person 160 appears. In other optional or additional aspects, the generating at block 308 may include causing the display 127 to display alerts indicating that the person 160 is denied access to one or more areas 115. Alternatively or additionally, the displayed alerts may indicate remediation steps that may be taken by the person 160 to comply with the mask wearing rule.

In other optional or additional aspects, the generating at block 308 may include transmitting a notification indicating that a mask wearing rule violation has been determined. In these optional or additional aspects, the generating at block 308 may include transmitting a message (e.g., email, SMS, automated voice call) to one or more recipients comprising an indication that the person 160 is in violation of the mask wearing rule. In some aspects, the notification may be transmitted to a third-party local to the environment 110, such as security personnel, building management personnel, and the like. Alternatively or additionally, the notification may be transmitted to a third-party remote to the environment 110, such as law enforcement, civil health authorities, and the like. In other optional or additional aspects, the notification may be transmitted to one or more recipients associated with the first area 115 in which the person 160 appears.

In other optional or additional aspects, the generating at block 308 may include providing the at least one video frame displaying the person 160 in violation of the mask wearing rule. In these optional or additional aspects, the message displayed by the display 127 may comprise the at least one video frame displaying the person 160 in violation of the mask wearing rule. Alternatively or additionally, the transmitted message (e.g., email, SMS, automated voice call) may comprise the at least one video frame displaying the person 160 in violation of the mask wearing rule.

Further, for example, the generating at block 308 may be performed to notify the appropriate persons and/or personnel of the mask wearing rule violation determined by the video surveillance system 100.

Figure 4:
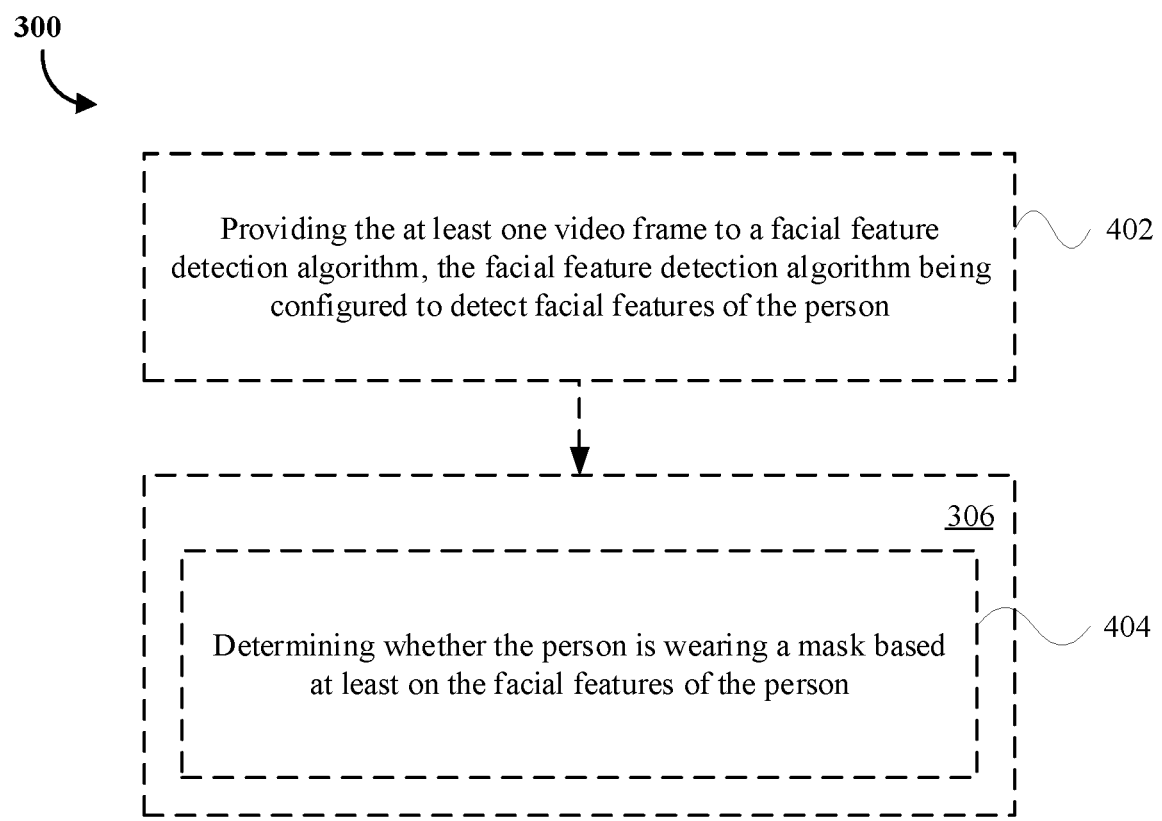
FIG. 4 is a flowchart of first additional or optional steps of the method of detecting mask usage to be performed by the computing device, in accordance with various aspects of the present disclosure.

Referring to FIG. 4, in an optional or additional aspect that may be combined with any other aspect, in block 402, the method 300 may further include providing the at least one video frame to a facial feature detection algorithm, the facial feature detection algorithm being configured to detect facial features of the person. For example, in an aspect, the computing device 130, the processor 133, the memory 135, the mask detection component 137, and/or the providing component 240 may be configured to or may comprise means for providing the at least one video frame to a facial feature detection algorithm, the facial feature detection algorithm being configured to detect facial features of the person 150, 160.

For example, the providing at block 402 may include providing to the facial feature detection algorithm the at least one video frame extracted from the one or more video feeds. In some aspects, the providing at block 402 may include providing identification information corresponding to the one or more persons 150, 160 appearing in the video frames to the facial feature detection algorithm. In some aspects, the identification information may comprise identifying information such as name, address, employer, access card identification number, key fob identification number, biometric information, and the like. The facial feature detection algorithm may be configured to detect facial features of the person 150, 160. For example, the facial feature detection algorithm may comprise a machine learning classifier having been trained to extract facial features (e.g., eyes, noses, mouths, ears) from video frames in which one or more persons appear. Alternatively or additionally, the facial feature detection algorithm may compare properties of base images of facial features with the properties of the video frames, such as color (e.g., hue, lightness, or saturation), object shape (e.g., shape of face), object size (e.g., of person), and/or other conventional image comparison attributes. For example, the base images may comprise a database of photos of people that work in a building and/or company.

Further, for example, the providing at block 402 may be performed to obtain facial features of the person 150, 160 that may be used to determine whether the person 150, 160 is wearing a mask.

In this optional or additional aspect, at block 404, the determining at block 306 of whether the one or more persons are in violation of the mask wearing rule may include determining whether the person is wearing a mask based at least on the facial features of the person. For example, in an aspect, the computing device 130, the processor 133, the memory 135, the mask detection component 137, and/or the determining component 230 may be configured to or may comprise means for determining whether the person is wearing a mask based at least on the facial features of the person.

For example, the determining at block 404 may include determining that the person is wearing a mask, such as person 150, if or when the facial features corresponding to the person 150 do not comprise nose and mouth facial features. The determining at block 404 may further include determining that a person is not wearing a mask, such as person 160, if or when the facial features corresponding to the person 160 comprise nose or mouth facial features.

Further, for example, the determining at block 404 may be performed to automatically determine that the person 150, 160 in environment 110 is wearing a mask. Such a determination may allow the video surveillance system 100 to automatically enforce mask wearing rules without the need for costly and labor intensive manual processes. Thus, aspects presented herein may increase accuracy and effectiveness of the enforcement of mask wearing rules over conventional video surveillance systems.

Figure 5:
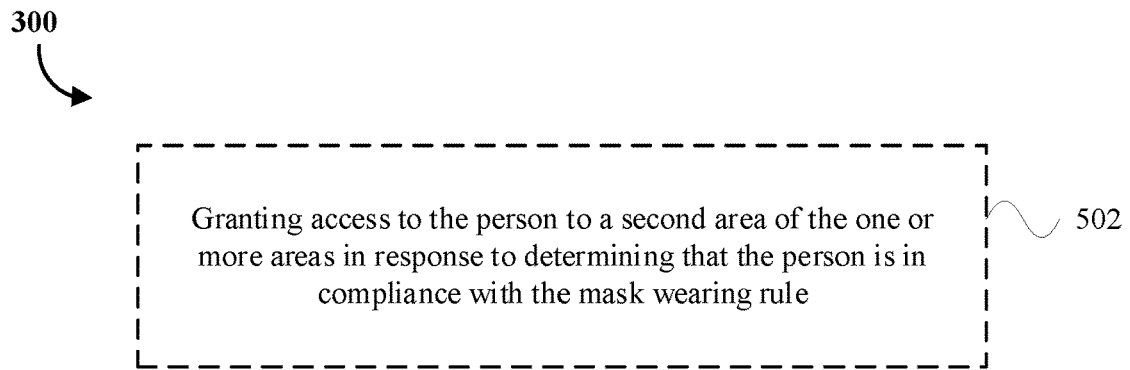
FIG. 5 is a flowchart of second additional or optional steps of the method of detecting mask usage to be performed by the computing device, in accordance with various aspects of the present disclosure.

Referring to FIG. 5, in an optional or additional aspect that may be combined with any other aspect, at block 502, the method 300 may further include granting access to the person to a second area of the one or more areas in response to determining that the person is in compliance with the mask wearing rule. For example, in an aspect, the computing device 130, the processor 133, the memory 135, the mask detection component 137, and/or the granting component 245 may be configured to or may comprise means for the mask wearing rule indicating the enforcement area.

For example, at block 502, the granting may include causing the access control point 117 to grant access to persons 150 that are wearing a mask. Alternatively or additionally, the granting at block 502 may include causing the access control point 117 to deny access to persons 160 that are not wearing a mask.

Further, for example, the granting at block 502 may allow the video surveillance system 100 to restrict access to the environment 110 according to the mask wearing rule.

Figure 6:
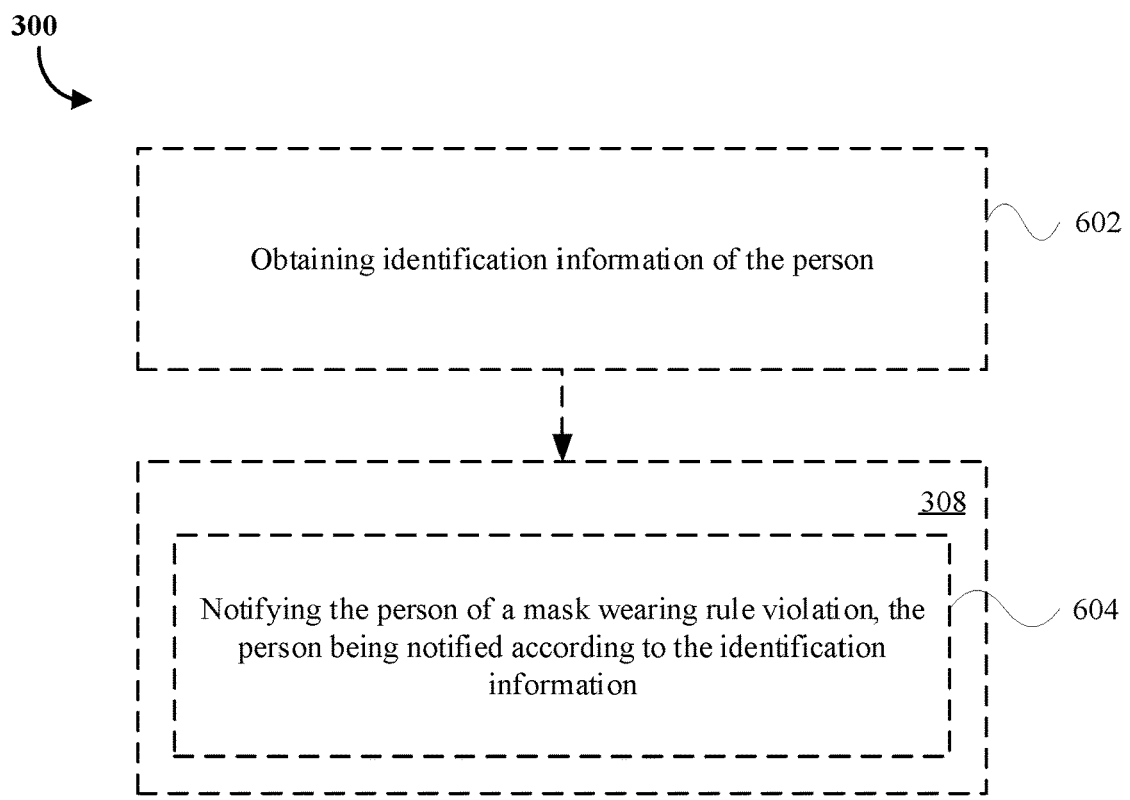
FIG. 6 is a flowchart of third additional or optional steps of the method of detecting mask usage to be performed by the computing device, in accordance with various aspects of the present disclosure.

Referring to FIG. 6, in an optional or additional aspect that may be combined with any other aspect, at block 602, the method 300 may further include obtaining identification information of the person. For example, in an aspect, the computing device 130, the processor 133, the memory 135, the mask detection component 137, and/or the obtaining component 250 may be configured to or may comprise means for obtaining identification information of the person.

For example, at block 602, the obtaining may include obtaining identification information that may comprise at least one image of the person. Alternatively or additionally, the obtaining at block 602 may include obtaining identification information that may comprise a database record comprising information with which a person 150, 160 may be identified, such as facial features. In some aspects, the obtaining at block 602 may include obtaining identification information that may comprise other identifying information such as name, address, employer, access card identification number, key fob identification number, biometric information, and the like.

Further, for example, the obtaining at block 602 may be performed to allow for identification of the person in violation of the mask wearing rule. As such, the person in violation of the mask wearing rule may be notified of the mask wearing rule according to the identification information.

In this optional or additional aspect, at block 604, the generating the alert at block 308 may include notifying the person of a mask wearing rule violation, the person being notified according to the identification information. For example, in an aspect the computing device 130, the processor 133, the memory 135, the mask detection component 137, and/or the notifying component 255 may be configured to or may comprise means for notifying the person of a mask wearing rule violation, the person being notified according to the identification information.

For example, at block 604, the notifying may include causing the speaker 125 to generate an audible alarm and/or a spoken message that may be audible by the person 160. In some aspects, the notifying at block 604 may include causing the display 127 to display textual, graphical, and/or video messages that may be visible by the person 160. In other optional or additional aspects, the notifying at block 604 may include transmitting a message (e.g., email, SMS, automated voice call) to the person 160 notifying the person 160 of the mask wearing rule violation. Alternatively or additionally, the notifying at block 604 may include indicating remediation steps that may be taken by the person 150, 160 to comply with the mask wearing rule.

Further, for example, the notifying at block 604 may be performed to make a person 160 aware that the person 160 is in violation of the mask wearing rule.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

In one or more aspects, the functions described herein may be implemented in hardware, software, firmware, or any combination thereof. If or when implemented in software, the functions may be stored or transmitted as one or more instructions or code on a computer-readable medium. The computer-readable medium (also referred to as computer-readable media) may include a computer storage medium which may be referred to as a non-transitory computer-readable medium. A non-transitory computer-readable medium may exclude transitory signals. Computer-readable media may include both computer storage media and communication media including any medium that may facilitate transfer of a computer program from one place to another. A storage medium may be any available media that can be accessed by a computer. By way of example, and not limitation, such computer-readable media can comprise RAM, ROM, electrically erasable programmable ROM ("EEPROM"), compact disc read-only memory ("CD-ROM") or other optical disk storage, magnetic disk storage or other magnetic storage devices, or any other medium that can be used to store desired program code in the form of instructions or data structures and that can be accessed by a computer. Disk and disc, as used herein, may include compact disc (CD), laser disc, optical disc, digital versatile disc (DVD), floppy disk and Blu-ray disc, where disks usually reproduce data magnetically, while discs usually reproduce data optically with lasers. Combinations of the above may also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of detecting mask usage, comprising:
monitoring video frames of one or more video feeds;
detecting a person in at least one video frame of the video frames, the at least one video frame corresponding to a first area of one or more areas;
detecting one or more detected facial features within the at least one video frame via a facial feature detection algorithm;
determining that the one or more detected facial features of the person comprise one or more particular facial features;
determining an occupancy rate of an enforcement area;
determining, in response to the occupancy rate exceeding an occupancy rate threshold, that the person is in violation of a mask wearing rule when the one or more detected facial features comprise the one or more particular facial features; and
generating an alert in response to determining that the person is in violation of the mask wearing rule.

2. The method of claim 1, wherein the one or more particular facial features include nose and mouth facial features.

3. The method of claim 1, wherein determining that the person is in violation of the mask wearing rule further comprises determining that the mask wearing rule indicates that the first area is a portion of the enforcement area of the mask wearing rule.

4. The method of claim 1, wherein the person is a first person, and further comprising:
granting access to a second person to a second area of the one or more areas in response to determining that the second person is in compliance with the mask wearing rule.

5. The method of claim 1, further comprising:
obtaining identification information of the person; and
wherein generating the alert comprises notifying the person of a mask wearing rule violation, the person being notified according to the identification information.

6. The method of claim 1, wherein generating the alert comprises providing the at least one video frame displaying the person in violation of the mask wearing rule.

7. The method of claim 1, wherein generating the alert comprises notifying one or more recipients of a mask wearing rule violation, the one or more recipients being associated with the first area.

8. An apparatus for detecting mask usage, comprising:
a non-transitory memory storing computer-executable instructions; and
a processor communicatively coupled with the non-transitory memory and configured to execute the computer-executable instructions to:
monitor video frames of one or more video feeds;
detect a person in at least one video frame of the video frames, the at least one video frame corresponding to a first area of one or more areas;
detect one or more detected facial features within the at least one video frame via a facial feature detection algorithm;
determine that the one or more detected facial features of the person comprise one or more particular facial features;
determine an occupancy rate of an enforcement area;
determine, in response to the occupancy rate exceeding an occupancy rate threshold, that the person is in violation of a mask wearing rule when the one or more detected facial features comprise the one or more particular facial features; and
generate an alert in response to determining that the person is in violation of the mask wearing rule.

9. The apparatus of claim 8, wherein the one or more particular facial features include nose and mouth facial features.

10. The apparatus of claim 8, wherein to determine that the person is in violation of the mask wearing rule further comprises to determine whether the mask wearing rule indicates that the first area is a portion of the enforcement area of the mask wearing rule.

11. The apparatus of claim 8, wherein the person is a first person, and the processor is configured to execute further computer-executable instructions to:
granting access to a second person to a second area of the one or more areas in response to determining that the second person is in compliance with the mask wearing rule.

12. The apparatus of claim 8, wherein the processor is configured to execute further computer-executable instructions to:
obtain identification information of the person; and
wherein to generate the alert comprises to notify the person of a mask wearing rule violation, the person being notified according to the identification information.

13. The apparatus of claim 8, wherein to generate the alert comprises to provide the at least one video frame displaying the person in violation of the mask wearing rule.

14. The apparatus of claim 8, wherein to generate the alert comprises to notify one or more recipients of a mask wearing rule violation, the one or more recipients being associated with the first area.

15. A non-transitory computer-readable medium storing computer-readable instructions for detecting mask usage, executable by a processor to:
   monitor video frames of one or more video feeds;
   detect a person in at least one video frame of the video frames, the at least one video frame corresponding to a first area of one or more areas;
   detect one or more detected facial features within the at least one video frame via a facial feature detection algorithm;
   determine that the one or more detected facial features of the person comprise one or more particular facial features;
   determine an occupancy rate of an enforcement area;
   determine, in response to the occupancy rate exceeding an occupancy rate threshold, that the person is in violation of a mask wearing rule when the one or more detected facial features comprise the one or more particular facial features; and
   generate an alert in response to determining that the person is in violation of the mask wearing rule.

16. The non-transitory computer-readable medium of claim 15, wherein the one or more particular facial features include nose and mouth facial features.

17. The non-transitory computer-readable medium of claim 15, wherein to determine that the person is in violation of the mask wearing rule comprises to determine that the mask wearing rule indicates that the first area is a portion of the enforcement area of the mask wearing rule.

18. The non-transitory computer-readable medium of claim 15, wherein the person is a first person and the computer-readable instructions comprise further computer-readable instructions to:
   grant access to a second person to a second area of the one or more areas in response to determining that the second person is in compliance with the mask wearing rule.

19. The non-transitory computer-readable medium of claim 15, wherein the computer-readable instructions comprise further computer-readable instructions to:
   obtain identification information of the person; and
   wherein to generate the alert comprises to notify the person of a mask wearing rule violation, the person being notified according to the identification information.

\* \* \* \* \*